(12) United States Patent
Samuel et al.

(10) Patent No.: US 8,249,106 B2
(45) Date of Patent: Aug. 21, 2012

(54) EXTENDED CELLULAR TELEPHONY PROTOCOL

(75) Inventors: Louis G. Samuel, Swindon (GB); Frederic Battaglia, Middletown, NJ (US); Theodore Sizer, Little Silver, NJ (US)

(73) Assignee: Alcatel Lucent, Paris (FR)

( * ) Notice: Subject to any disclaimer, the term of this patent is extended or adjusted under 35 U.S.C. 154(b) by 1370 days.

(21) Appl. No.: 10/924,115

(22) Filed: Aug. 23, 2004

(65) Prior Publication Data

US 2006/0039349 A1      Feb. 23, 2006

(51) Int. Cl.
| | |
|---|---|
| H04W 4/00 | (2009.01) |
| H04L 12/28 | (2006.01) |
| H04J 3/16 | (2006.01) |
| H04J 3/00 | (2006.01) |
| G06F 15/16 | (2006.01) |

(52) U.S. Cl. ........ 370/474; 370/328; 370/338; 370/401; 370/469; 370/476; 709/230

(58) Field of Classification Search .................. 370/328, 370/331, 352–353, 389, 392, 401, 465–467, 370/469, 474, 476; 709/230, 227–228, 236, 709/246, 249; 455/422.1, 426.2, 432.2, 436, 455/437, 442–444

See application file for complete search history.

(56) References Cited

U.S. PATENT DOCUMENTS

| | | | | |
|---|---|---|---|---|
| 5,953,322 A * | 9/1999 | Kimball | ........................ | 370/328 |
| 6,829,228 B2 * | 12/2004 | Takabatake et al. | .......... | 370/338 |
| 6,879,600 B1 * | 4/2005 | Jones et al. | .................... | 370/466 |
| 6,909,705 B1 * | 6/2005 | Lee et al. | ....................... | 370/338 |
| 7,010,300 B1 * | 3/2006 | Jones et al. | .................... | 455/439 |
| 7,027,774 B2 * | 4/2006 | Kuon | ........................... | 455/41.2 |
| 7,293,110 B2 * | 11/2007 | Dowling | ....................... | 709/249 |
| 2002/0071480 A1 * | 6/2002 | Marjelund et al. | ............ | 375/141 |
| 2002/0160779 A1 * | 10/2002 | Arazi et al. | .................... | 455/444 |
| 2003/0002473 A1 * | 1/2003 | Goodings et al. | ............. | 370/349 |
| 2003/0048795 A1 * | 3/2003 | Pinault | .......................... | 370/401 |
| 2003/0139179 A1 * | 7/2003 | Fuchs et al. | .................... | 455/426 |
| 2004/0037314 A1 * | 2/2004 | Spear | ............................ | 370/466 |

(Continued)

FOREIGN PATENT DOCUMENTS

EP            1 137 240 A       6/2001

(Continued)

OTHER PUBLICATIONS

Specification of the Bluetooth System, vol. 1, V.1.0B, Dec. 1, 1999.*

(Continued)

*Primary Examiner* — Andrew Chriss
*Assistant Examiner* — Redentor Pasia
(74) *Attorney, Agent, or Firm* — Williams, Morgan & Amerson

(57) ABSTRACT

The present invention provides a method for transmitting voice packet data over a selected one of a first network in which multiple devices belonging to a defined set communicate with each other according to a first protocol and a second network in which multiple devices communicate with each other according to a second protocol, different from the first protocol. The method includes establishing at least one radio bearer between at least two devices in the first network according to the first protocol, receiving at least one voice packet that conforms to the second protocol, modifying the at least one voice packet to conform to the first and the second protocols, and transmitting the at least one modified voice packet using the at least one radio bearer.

22 Claims, 8 Drawing Sheets

U.S. PATENT DOCUMENTS

| | | | |
|---|---|---|---|
| 2004/0120283 A1 | 6/2004 | Rezaiifar et al. | 370/328 |
| 2004/0203382 A1* | 10/2004 | Park | 455/41.2 |
| 2004/0264414 A1* | 12/2004 | Dorenbosch | 370/332 |
| 2005/0025182 A1* | 2/2005 | Nazari | 370/469 |
| 2005/0078616 A1* | 4/2005 | Nevo et al. | 370/278 |
| 2005/0083971 A1* | 4/2005 | Delaney et al. | 370/466 |
| 2005/0232284 A1* | 10/2005 | Karaoguz et al. | 370/401 |
| 2006/0020617 A1* | 1/2006 | Grimminger et al. | 707/102 |
| 2006/0023662 A1* | 2/2006 | Inoue | 370/328 |
| 2006/0023697 A1* | 2/2006 | Shore et al. | 370/352 |
| 2007/0142070 A1* | 6/2007 | Soldani et al. | 455/515 |

FOREIGN PATENT DOCUMENTS

| | | |
|---|---|---|
| WO | WO 02/13462 | 2/2002 |
| WO | WO 2004/012374 | 2/2004 |

OTHER PUBLICATIONS

European Search Report EP 05 25 5105 dated Nov. 4, 2005.

Q.931, *Digital Subscriber Signalling System No. 1(DSS 1)—ISDN User-Network interface Layer 3 Specification for Basic Call Control*, Mar. 1993.

3GPP TS 25.331 V3.9.0 (Dec. 2001), *Radio Resource Control (RRC), Protocol Specification (Release 1999)*.

\* cited by examiner

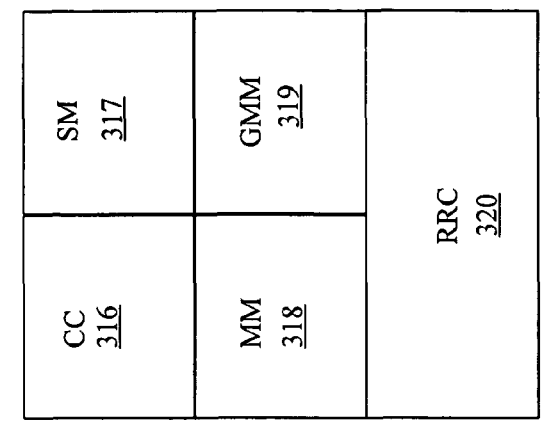
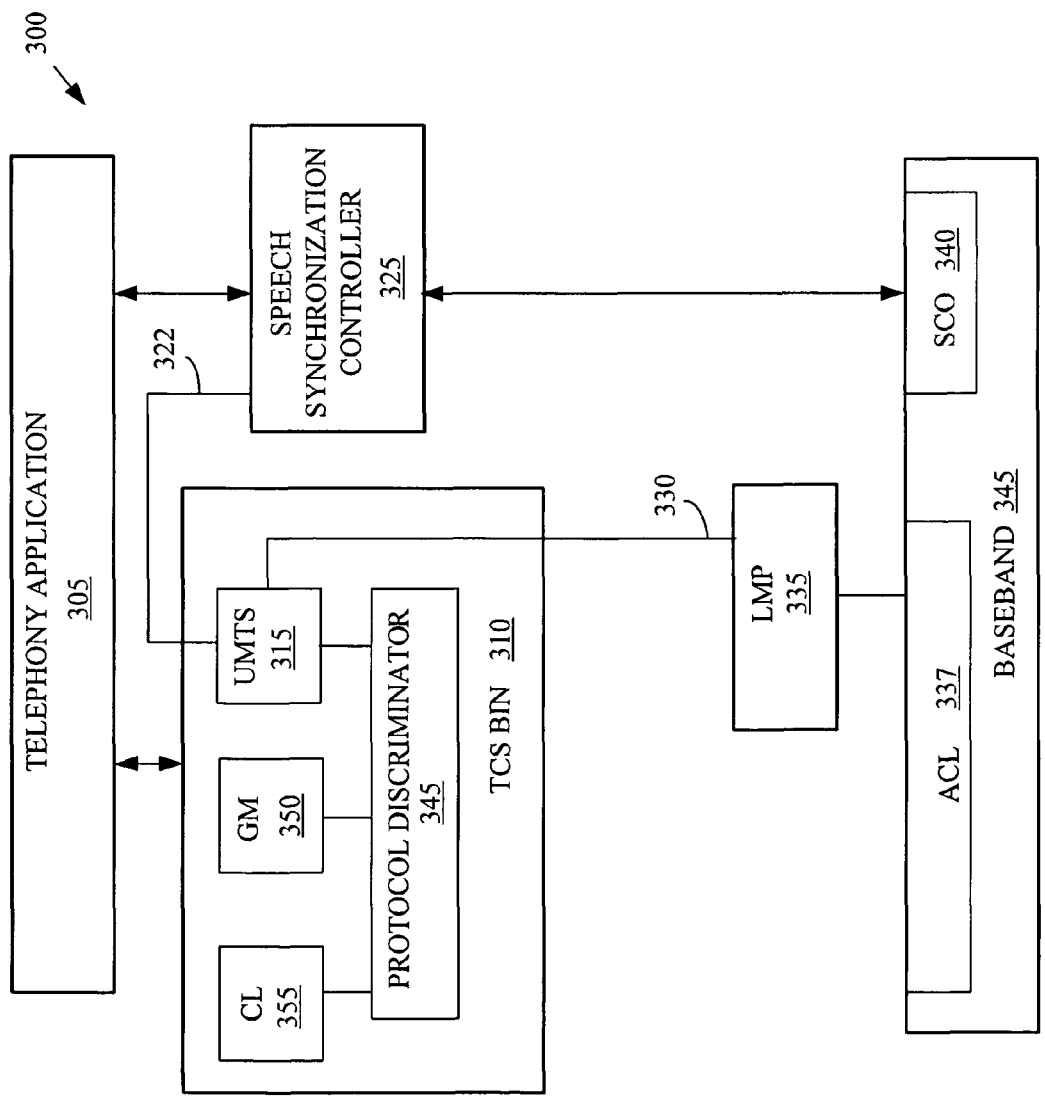
Figure 3B
Figure 3A

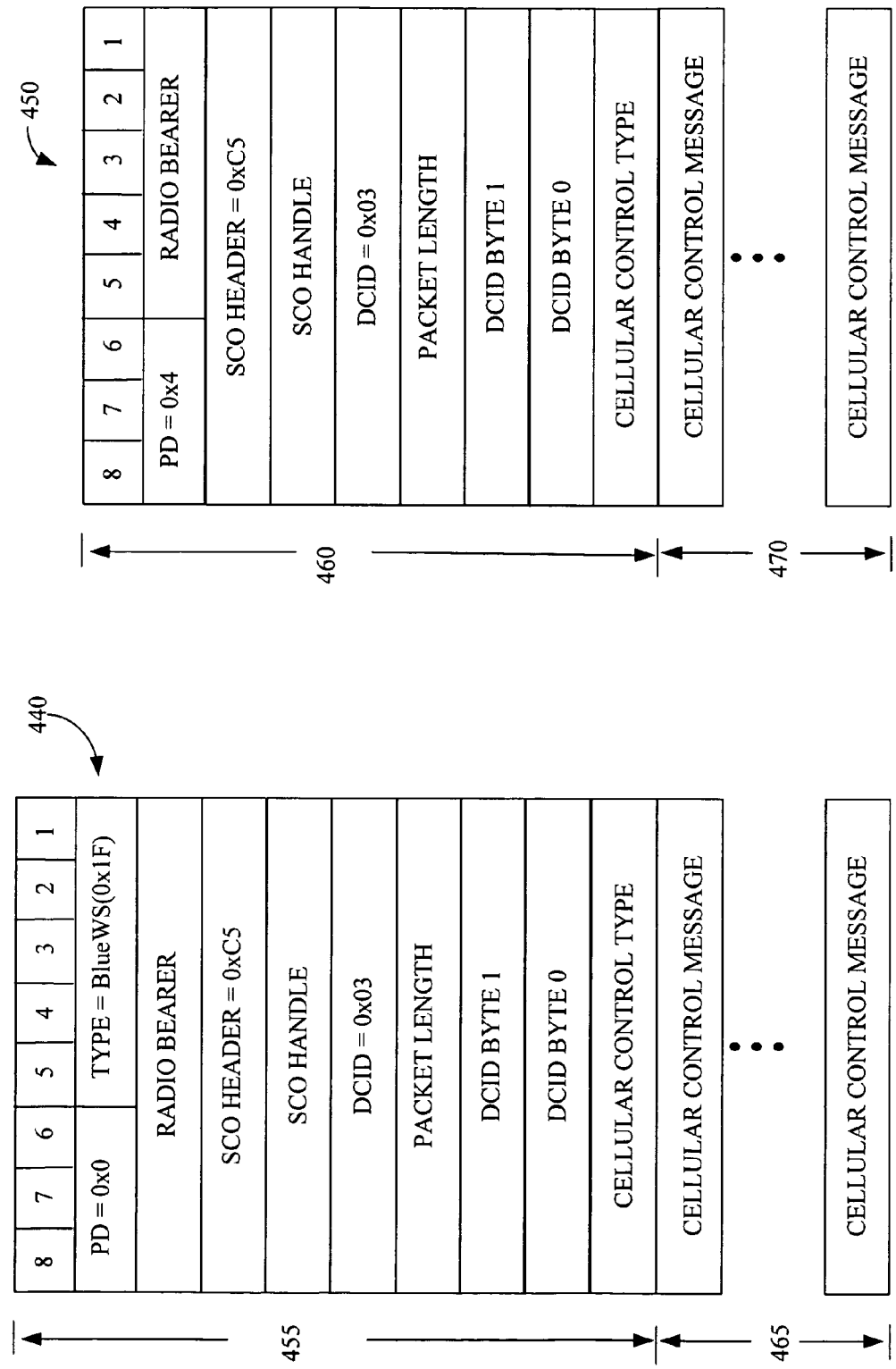

EXTENDED CELLULAR TELEPHONY PROTOCOL

BACKGROUND OF THE INVENTION

1. Field of the Invention

This invention relates generally to telecommunication systems, and, more particularly, to wireless telecommunication systems.

2. Description of the Related Art

The list of devices that use wireless communication techniques, such as a cellular telephone system, to transmit voice and data signals has expanded dramatically in recent years to include, among other things, cell phones, personal data assistants, global positioning system receivers, laptop computers, and desktop computers. And the number of devices on the list, as well as the services they are likely to provide, is expected to continue to grow. The proliferation of wireless communication systems has led users to expect to access these systems at virtually any time and in virtually any place.

Wireless telecommunication systems, such as cellular telephone systems, typically include one or more base stations that can establish concurrent communication links with one or more mobile units in geographic areas, referred to hereinafter as cells, associated with the base stations. The range of a wireless communication link is limited by the transmission power of the base station and mobile units, the sensitivity of receivers in the base stations and mobile units, obstacles between the base station and mobile units, and the like. Thus, while cellular telephone systems provide reasonably reliable service in open and/or outdoor environments, the quality and/or reliability of a cellular telephone connection between a base station and a mobile unit may be reduced when the mobile unit is used in or near structures such as office buildings, warehouses, and the like. Moreover, cellular telephony may not be supported in every location.

Alternative communication protocols have been developed to provide reliable, high quality communication networks in constrained settings such as building interiors. For example, the Bluetooth standard is commonly used to implement short distance wireless networks having a defined set of member devices, which are sometimes referred to as piconets. Bluetooth compatible devices transmit data and/or voice over an air interface, or wireless communication link, in the Industrial, Scientific, and Medical (ISM) frequency band at about 2.4 GHz using a frequency-hopping technique. Due in part to the frequency-hopping characteristics of the Bluetooth standard, the communication link formed according to the Bluetooth standard has a reasonable chance of maintaining link quality in the presence of interference. The Bluetooth standard is well known to persons of ordinary skill in the art, and so, in the interest of clarity, only those aspects of the Bluetooth standard that are relevant to the present invention will be discussed herein.

FIG. 1A conceptually illustrates a K3 cordless telephony profile stack 100, which may be used by mobile units and/or base stations to form one or more wireless telecommunication links according to a conventional Bluetooth protocol. Persons of ordinary skill in the art should appreciate that only those elements of the K3 cordless telephony profile stack 100 that are relevant to the present invention are illustrated herein. Voice packets are received by a telephony application 105, which provides the voice packets and other control signals to a Telephony Control protocol Specification Binary (TCS Bin) block 110. The TCS Bin block 110 generally functions by enabling a connection-oriented link between a terminal (not shown) and a gateway (not shown). The link is unique to the gateway and enables the gateway to host multiple TCS bins. In this manner, signals transmitted between the TCS Bin blocks 110 associated with different users can be discriminated. For voice services, a link identifier and an associated identifier (the SCO handle) identify the voice channel to the gateway.

FIG. 1B shows a conventional TCS Bin header 112 that includes a three-bit protocol discriminator field (PD) for discriminating internal messaging. A protocol discriminator 111 uses the TCS Bin header 115, which is typically attached or appended to each voice packet, to determine how the voice packets provided to the TCS Bin 110 are handled. The Bluetooth standard has explicitly defined three values for the protocol discriminator field (PD). A value of 0x0 in the protocol discriminator field indicates that a call control (CC) block 120 should handle the message, a value of 0x1 in the protocol discriminator field indicates that a group management (GM) block 122 should handle the message, and a value of 0x2 in the protocol discriminator field indicates that a connectionless (CL) block 124 should handle the message. All other values of the protocol discriminator are reserved in the Bluetooth standard. Once the TCS Bin block 110 has decided the recipient of the message, the message itself is identified by a five-bit type field (TYPE).

Referring back to FIG. 1A, the functionality of the TCS Bin block 110 is determined by the call control (CC) block 120, which provides ITU-T Q.931 call control functionality that is common to most types of cellular and fixed line telephony. The call control (CC) block 120 manages a voice channel via an interface 125 with a speech synchronization controller 115 and an interface 130 with a link manager protocol (LMP) block 135. For example, the call control (CC) block 120 may connect and/or disconnect internal speech paths by providing signals to the speech synchronization controller 115 via the interface 125 and may establish and/or release voice synchronization control links by providing signals to the link manager protocol (LMP) block 135 via the interface 130. The link manager protocol (LMP) block 135 is coupled to an asynchronous control block 137. The interfaces 125, 130 enable the speech synchronization controller 115 to directly control the voice path from the telephony application 105 to a synchronous controller 140 in a baseband 145. Thus, the telephony application 105 typically obtains guaranteed quality and/or delay characteristics.

A growing number of mobile units, such as cellular wireless telephones include both a conventional cellular telephone interface and a Bluetooth interface. Thus, a mobile unit may be able to place a wireless telephony call according to two protocols: a cellular voice protocol (such as UMTS, GSM, IS95, CDMA200, etc) and a Bluetooth protocol. Both the cellular voice protocol and the Bluetooth protocol provide inherent quality guarantees for the voice application and attempt to guarantee that the delay experienced by the voice traffic will remain below a predetermined level. The cellular voice protocol also allows a mobile unit to move from one cell to another. The Bluetooth protocol, however, does not allow for mobility outside of the mobile unit's current piconet. Moreover, only the call state is maintained and the Bluetooth protocol typically relies on an outside network connection for onward guarantees of the delay and quality. Examples of the outside network include a public switched telephone network (PSTN) home base station, an Integrated Services Digital Network (ISDN) home base station, a GSM gateway, a satellite gateway, and an H.323 gateway.

The present invention is directed to addressing the effects of one or more of the problems set forth above.

SUMMARY OF THE INVENTION

In one embodiment of the instant invention, a method is provided for transmitting voice packet data over a selected one of a first network in which multiple devices belonging to a defined set communicate with each other according to a first protocol and a second network in which multiple devices communicate with each other according to a second protocol, different from the first protocol. The method includes establishing at least one radio bearer between at least two devices in the first network according to the first protocol, receiving at least one voice packet that conforms to the second protocol, modifying the at least one voice packet to conform to the first and the second protocols, and transmitting the at least one modified voice packet using the at least one radio bearer.

In another embodiment of the present invention, a method is provided for transmitting voice packet data over a selected one of a piconet in which multiple Bluetooth-enabled devices within a defined set communicate with each other by exchanging messages with a master device within the set using a Bluetooth protocol and a cellular wireless network in which mobile units and base stations exchange messages according to a cellular telephony protocol. The method includes establishing at least one radio bearer between at least two devices in the piconet according to the Bluetooth protocol, receiving at least one voice packet that conforms to the cellular telephony protocol, modifying the at least one voice packet to conform to the Bluetooth and the cellular telephony protocols, and transmitting the at least one modified voice packet using the at least one radio bearer.

BRIEF DESCRIPTION OF THE DRAWINGS

The invention may be understood by reference to the following description taken in conjunction with the accompanying drawings, in which like reference numerals identify like elements, and in which:

FIG. 3A conceptually illustrates a cordless telephony profile stack that may be used in the wireless telephony system shown in FIG. 2, in accordance with the present invention;

FIG. 3B conceptually illustrates a cellular control stack that may be used in the model is telephony profile stack shown in FIG. 3A, in accordance with the present invention;

FIGS. 4A, 4B, 4C, and 4D conceptually illustrate first, second, third, and fourth exemplary embodiments of a voice packet, in accordance with the present invention;

Figure 1:
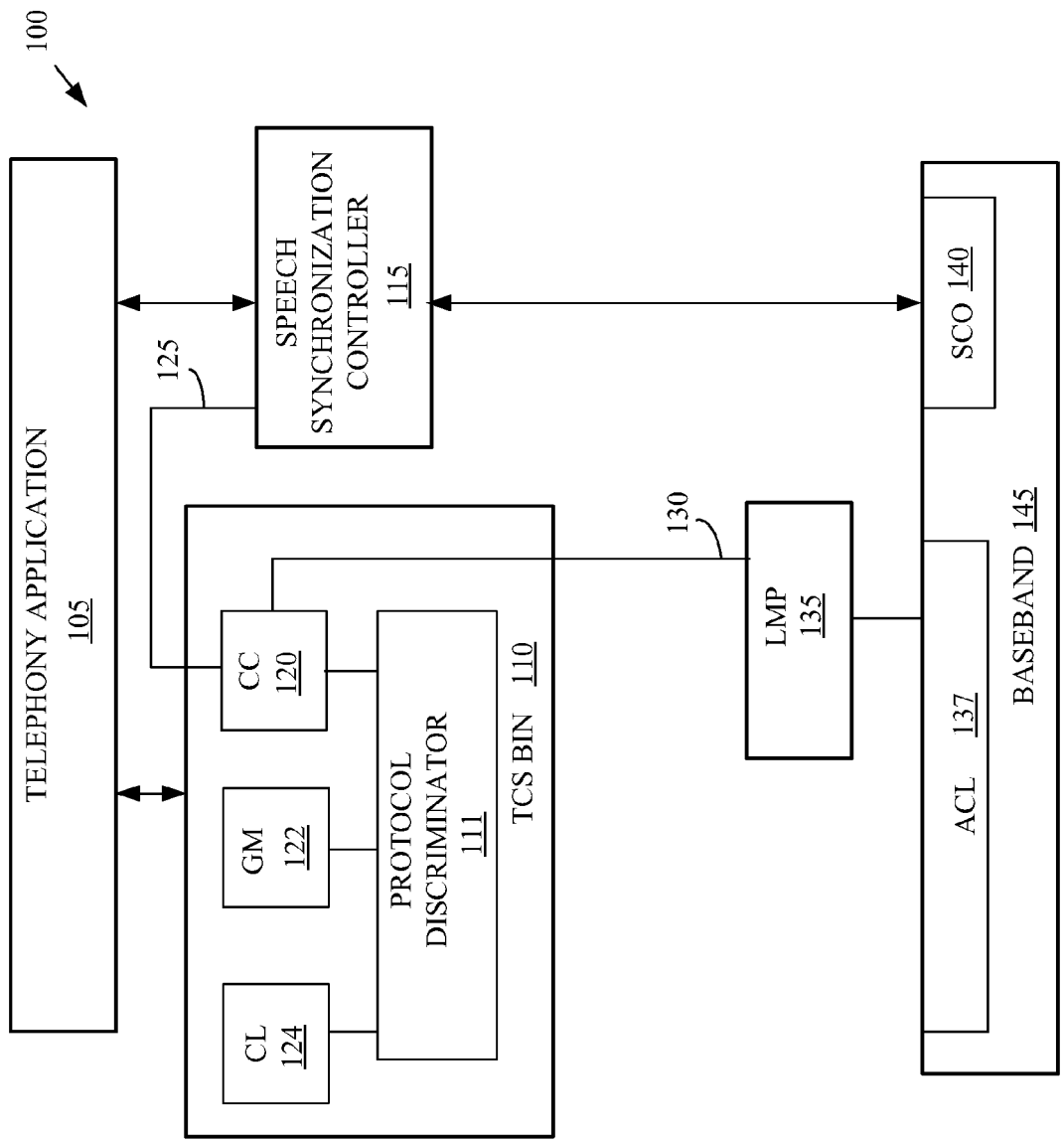
FIG. 1A conceptually illustrates a K3 cordless telephony profile stack.
FIG. 1B shows a conventional TCS Bin header that includes a three-bit protocol discriminator field (PD) for discriminating internal messaging.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
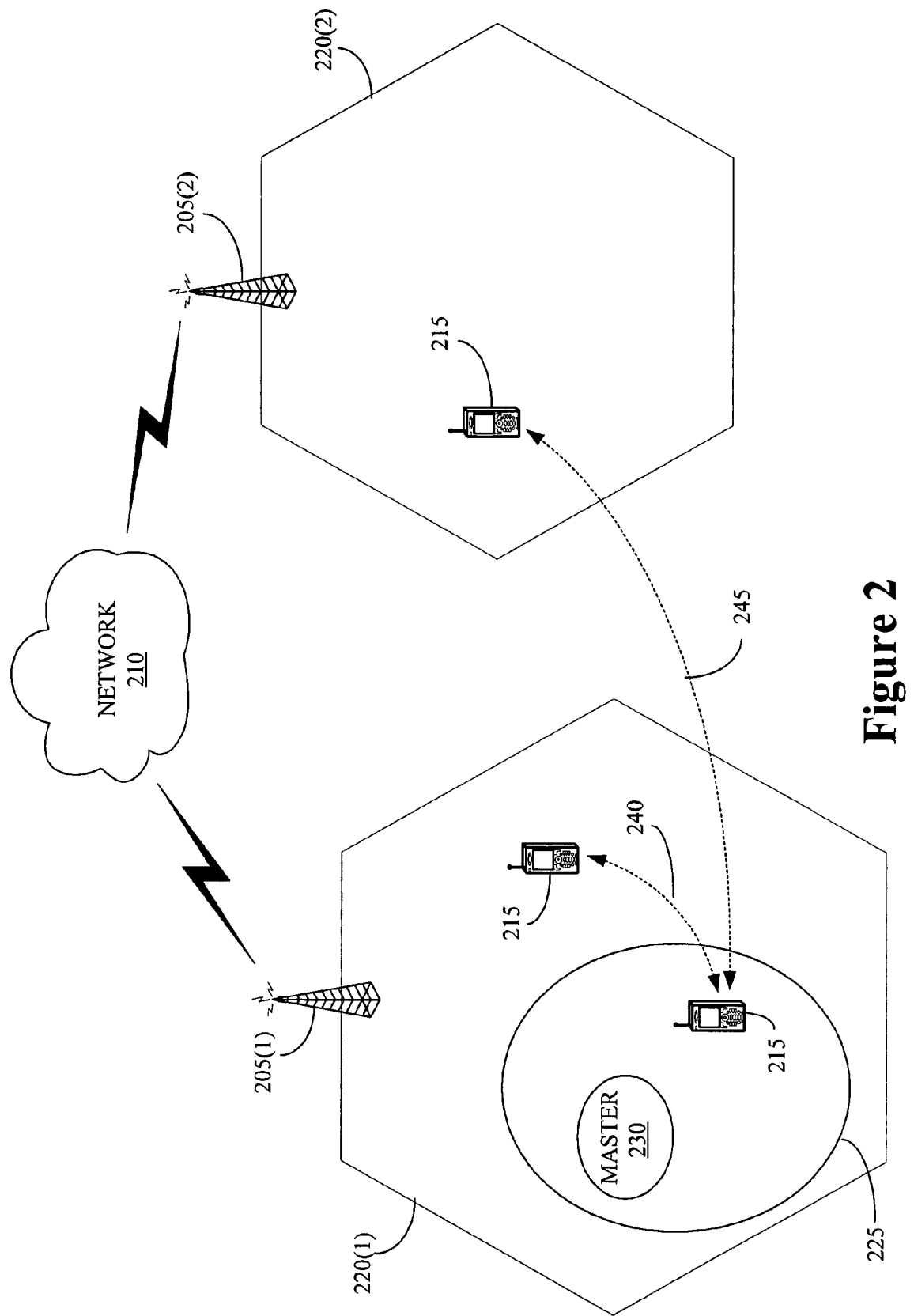
FIG. 2 conceptually illustrates a wireless telephony system, in accordance with the present invention.

FIG. 2 conceptually illustrates a wireless telecommunication system 200. The wireless telecommunications system 200 includes one or more base stations 205(1-2) that are communicatively coupled via a network 210. In various alternative embodiments, the network 210 may include a local area network, a wide area network, the World Wide Web, an Integrated Services Digital Network (ISDN) network, an Intranet, a Public Switched Telephone Network (PSTN), a plain old telephone service (POTS), a cellular telephone network, a satellite network, and the like. However, persons of ordinary skill in the art should appreciate that the aforementioned types of networks are exemplary and are not intended to limit the present invention.

The base stations 205(1-2) may establish one or more concurrent wireless communication links with one or more mobile devices 215 deployed within a corresponding geographic area 220(1-2), referred to hereinafter as a cell 220(1-2). In the illustrated embodiment, the base stations 205 (1-2) establish the one or more concurrent wireless telecommunication links according to a Universal Mobile Telephone System (UMTS) protocol. However, persons of ordinary skill in the art should appreciate that the present invention is not limited to the UMTS protocol. In various alternative embodiment, the concurrent wireless communication links may be established according to any desirable cellular telephony protocol including, but not limited to, a Global System for Mobile telecommunications (GSM) protocol, a Code Division Multiple Access (CDMA, CDMA-2000) protocol, an IS-95 protocol, a Personal Communication Services (PCS) protocol, and a Third Generation Partnership Project (3GPP, 3GPP2) protocol.

The wireless telecommunications system 200 also includes at least one network 225 in which multiple devices belonging to a defined set communicate with each other according to a protocol. In the illustrated embodiment, the network 225 is a piconet 225 including a master 230 that is configured to send and/or receive messages from devices in the piconet 225 according to a Bluetooth protocol. However, persons of ordinary skill in the art should appreciate that the network 225 is not limited to a piconet that operates according to the Bluetooth protocol and any desirable network 225 in which multiple devices belonging to a defined set communicate with each other according to any desirable protocol may be used. In the illustrated embodiment, the piconet 225 is depicted as being entirely within the cell 220(1) and entirely outside of the cell 220(2). However, persons of ordinary skill in the art should appreciate that, in alternative embodiments, a portion of the piconet 225 may be outside of the cell 220(1) and a portion of the piconet 225 may be inside the cell 220(2).

The mobile device 215 is configured to communicate with the master 230 according to the Bluetooth protocol and with one or more of the base stations 205(1-2) according to a cellular telephony protocol. As will be discussed in detail below, the mobile device 215 and the master 230 include mobile telephony stacks that enable the mobile device 215 to roam between the piconet 225 and the cells 220(1-2), as indicated by the dashed lines 240, 245. For example, the mobile device 215 may communicate with the master 230, which may then communicate with the base station 205(1) and/or a radio network controller (not shown) within the cellular network, usually over a fixed link. When the mobile device 215 determines that the reliability and/or quality of communication with the master 230 is superior to the reliability and/or quality of communication with the base station 205(1). The master 230 and mobile device 215 communicate according to the Bluetooth protocol. However, if the mobile device 215 roams outside of the piconet 225, a vertical handoff may be performed so that the mobile device 215 communicates directly with the base station 205(1) according to the cellular telephony protocol.

As indicated by the dashed line 245, the mobile device 215, which implements the mobile telephony stack, may also roam between the piconet 225 and the cell 220(2), which does not overlap with the piconet 225. For example, when the mobile device 215 roams from the cell 220(2) to the piconet 225, a vertical handoff may be performed so that the mobile device 215, which may originally have been in communication with the base station 205(2) according to the cellular telephony protocol, communicates with the master device according to the Bluetooth protocol. However, persons of ordinary skill in the art should appreciate that a brief interruption in service may occur when the mobile device 215 roams between the piconet 225 and the cell 220(2). For example, a user may hear a click or a pop when the mobile device 215 roams between the piconet 225 and the cell 220(2).

FIG. 3A conceptually illustrates one embodiment of a cordless telephony profile stack 300, which may be used to form one or more wireless telecommunication links according to a Bluetooth protocol and/or a cellular telephony protocol. Persons of ordinary skill in the art should appreciate that only those elements of the cordless telephony profile stack 300 that are relevant to the present invention are illustrated herein. In operation, voice packets are received by a telephony application 305, which provides the voice packets and other control signals to a Telephony Control protocol Specification Binary (TCS Bin) block 310. As discussed above, the TCS Bin block 310 generally functions by enabling a connection-oriented link between a terminal (not shown) and a gateway (not shown). The link is unique to the gateway and enables the gateway to host multiple TCS bins. In this manner, signals transmitted between the TCS Bin blocks 310 associated with different users can be discriminated. For voice services, a link identifier and an associated identifier (the SCO handle) identify the voice channel to the gateway.

The TCS Bin block 315 includes a cellular control stack block 315. In the illustrated embodiment, the cellular control stack block 315 is a Universal Mobile Telephone System (UMTS) block 315. However, persons of ordinary skill in the art should appreciate that any desirable cellular telephony control stack may be used to implement the cellular control stack block 315. In one exemplary embodiment shown in FIG. 3B, the UMTS block 315 includes a call control (CC) block 316, a SM block 317, a Mobility Management (MM) block 318, a GPRS Mobility Management (GMM) block 319, and a Radio Resource Control (RRC) block 320. However, persons of ordinary skill in the art should appreciate that FIG. 3B is merely one example of the UMTS block 315 and, in alternative embodiments, the UMTS block 315 may include more or fewer blocks of the same or different types.

The UMTS block 315 manages a voice channel via an interface 322 with a speech synchronization controller 325 and an interface 330 with a link manager protocol (LMP) block 335. For example, the UMTS block 315 may connect and/or disconnect internal speech paths by providing signals to the speech synchronization controller 325 via the interface 325 and may establish and/or release voice synchronization control links by providing signals to the link manager protocol (LMP) block 335 via the interface 330. The link manager protocol (LMP) block 335 is coupled to an asynchronous control block 337. The interfaces 325, 330 enable the speech synchronization controller 325 to directly control the voice path from the telephony application 305 to a synchronous controller 340 in a baseband 345. Thus, the telephony application 305 typically obtains guaranteed quality and/or delay characteristics. Moreover, backward compatibility of the cordless telephony profile stack 300 is achieved by retaining the mechanisms and functions that are required to communicate over interfaces 322, 330, as well as other interfaces not shown in FIG. 3A. Thus, crucial aspects of the legacy signalling techniques are preserved without alteration. For example, techniques for set-up of control and voice channels over the Bluetooth air interface are preserved.

As discussed above, in one embodiment, a protocol discriminator 345 uses a three-bit protocol discriminator field (PD), which is typically attached or appended to each voice packet, to determine how the voice packets provided to the TCS Bin 310 are handled. The Bluetooth standard has explicitly defined three values for the protocol discriminator field (PD). For example, a value of 0x1 in the protocol discriminator field indicates that a group management (GM) block 350 should handle the message. For another example, a value of 0x2 in the protocol discriminator field indicates that a connection-less (CL) block 355 should handle the message. All other values of the protocol discriminator are reserved in the Bluetooth standard. Once the TCS Bin block 310 has decided the recipient of the message, the message itself is identified by a five-bit type field (TYPE). In various alternative embodiments, the protocol discriminator 345 also uses the three-bit protocol discriminator field (PD) and/or the message type field to determine how cellular voice packets that are provided to the TCS Bin 310 are handled.

Figures 4A, 4B:
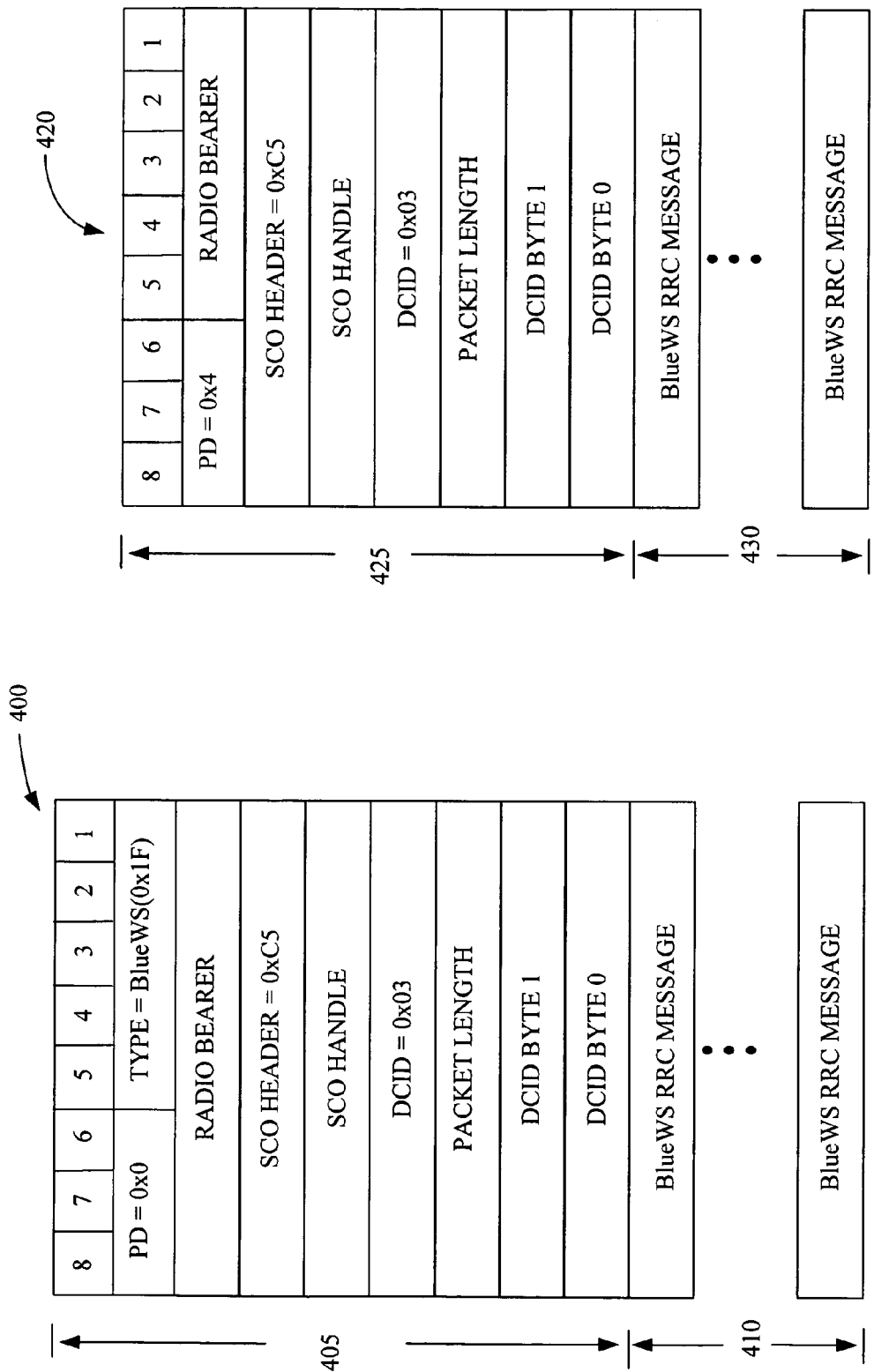

FIG. 4A conceptually illustrates a first exemplary embodiment of a voice packet 400, which includes a header 405 and a message body 410. The header 405 includes, among other conventional fields, a three-bit protocol discriminator (PD) field and a five-bit message type (TYPE) field that are used to indicate that the voice packet 400 conforms to the applicant protocol and, in the illustrated embodiment, a UMTS protocol. For example, when the value of the protocol discriminator field is 0x0, the protocol discriminator block 345 (shown in FIG. 3A) determines that the voice packet 400 may be handled by the call control block 316 in the UMTS block 315 (shown in FIG. 3A) according to the UMTS protocol. And when the value of the message type field is 0x1F, the protocol discriminator block 345 (shown in FIG. 3A) determines that the voice packet 400 may also be handled by the UMTS block 315 according to the Bluetooth protocol.

FIG. 4B conceptually illustrates a second exemplary embodiment of a voice packet 420, which includes a header 425 and a message body 430. The header 425 of the second exemplary embodiment includes a three-bit protocol discriminator (PD) field and a five-bit radio bearer type. In the illustrated embodiment, the protocol discriminator block 345 (shown in FIG. 3A) determines that the voice packet 420 may be handled by the call control block 316 in the UMTS block 315 (shown in FIG. 3A) according to the UMTS protocol and/or according to the Bluetooth protocol when the value of the protocol discriminator field is 0x4. When the value of the protocol discriminator field is 0x0, the protocol discriminator block 345 (shown in FIG. 3A) determines that the voice packet 420 may be handled by the call control block 316 according to the Bluetooth protocol FIGS. 4C and 4D conceptually illustrate third and fourth exemplary embodiments of the voice packet 440, 450, respectively. The headers 455, 460 and message bodies 465, 470 of the third and fourth exemplary embodiments are similar to the first and second exemplary embodiments, respectively. However, the third and fourth exemplary embodiments are not limited to the UMTS protocol. In particular, the headers 455, 460 of the third and fourth exemplary embodiments include a cellular control type field that may be used to indicate the appropriate cellular telephony protocol. For example, the cellular control type field may include a value indicative of a Global System for Mobile telecommunications (GSM) protocol, a Code Division Multiple Access (CDMA, CDMA-2000) protocol, an IS-95 protocol, a Personal Communication Services (PCS) protocol, a Third Generation Partnership Project (3GPP, 3GPP2) protocol, and the like.

Figure 5:
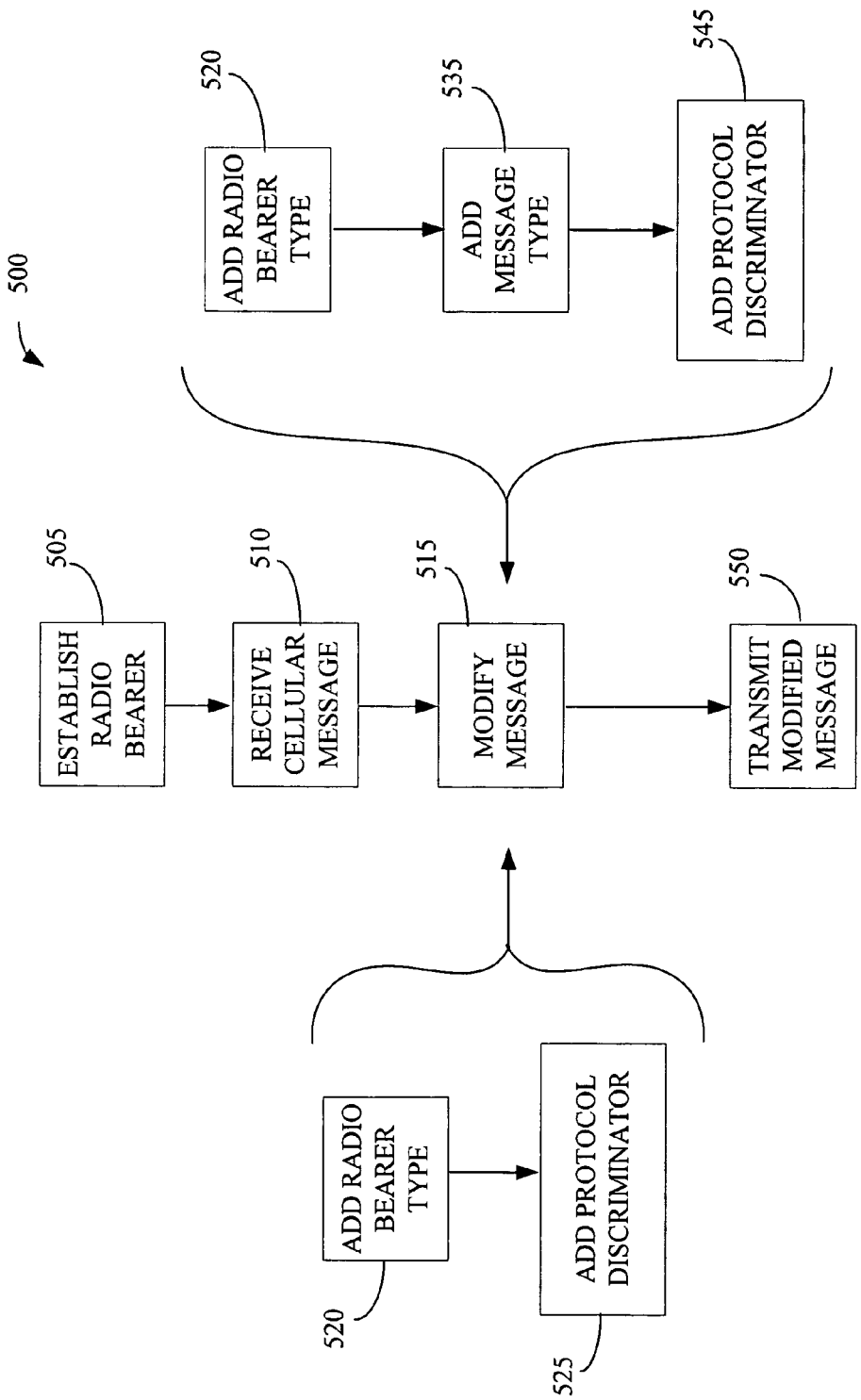
FIG. 5 illustrates one embodiment of a method that may be used to transmit one or more messages using a Bluetooth protocol and a cellular telephony protocol, in accordance with the present invention.

FIG. 5 illustrates one embodiment of a method 500 that may be used to transmit one or more messages using the Bluetooth protocol and a cellular telephony protocol. However, persons of ordinary skill in the art should appreciate that the present invention is not limited to the Bluetooth protocol and/or the cellular telephony protocol. In alternative embodiment, the method 500 may be used to transmit messages over any desirable network in which multiple devices belonging to a defined set communicate with each other according to a first protocol and/or any desirable network in which multiple devices communicate with each other according to a second protocol, different from the first protocol.

In the method 500, a radio bearer is established (at 505). For example, a master device may establish (at 505) a radio bearer in the Industrial Scientific Medical frequency band for communicating with a slave device in a piconet. A message conforming to a cellular telephony protocol is then received (at 510). In one embodiment, such as may be implemented by a mobile unit, receiving (at 510) the message may include receiving a signal indicative of a user's voice, such as one or more voice packets that conform to a cellular telephony protocol. In another embodiment, such as may be implemented by a master device in communication with a base station, receiving (at 510) the message may include receiving one or more voice packets that conform to a cellular telephony protocol, such as a UMTS protocol.

The message conforming to the cellular telephony protocol is modified (at 515). For example, a voice packet may be modified (at 515) by appending a header to the voice packet. In one embodiment, modifying (at 515) the message by appending the header comprises adding (at 520) a radio bearer type and adding (at 525) a protocol discriminator field. For example, a protocol discriminator field value of 0x4 may be added (at 525). In another embodiment, modifying (at 515) the message by appending the header comprises adding (at 530) a radio bearer type, adding (at 535) a message type field, and adding (at 540) a protocol discriminator field. For example, a message type field having a value of 0x1F may be added (at 535) and a protocol discriminator field having a value of 0x0 may be added (at 540). The modified message is then transmitted (at 550) using, e.g. the radio bearer.

Figure 6:
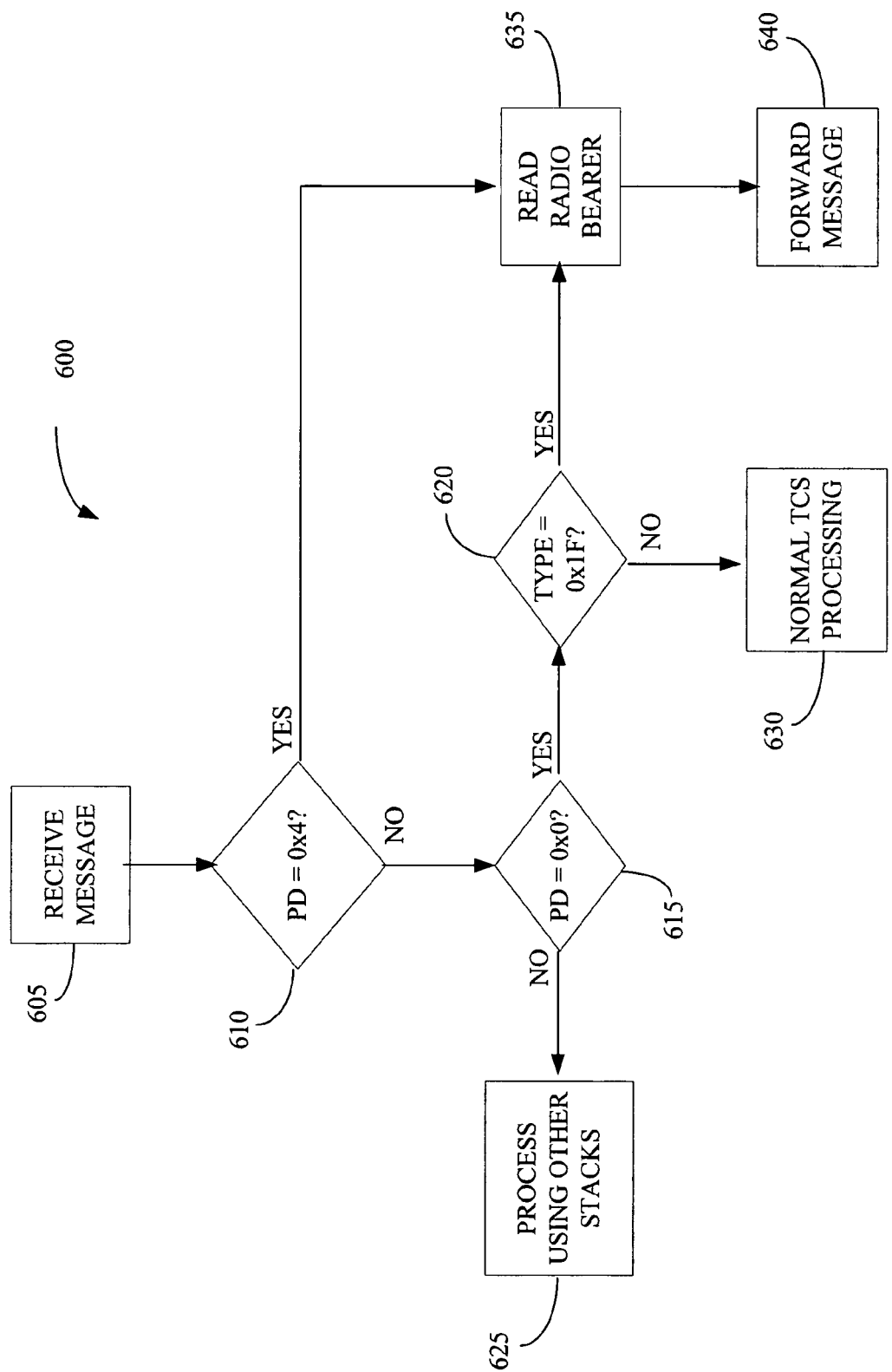
FIG. 6 illustrates one embodiment of a method that may be used to receive one or more messages using a Bluetooth protocol and a cellular telephony protocol, in accordance with the present invention.

FIG. 6 illustrates one embodiment of a method 600 that may be used to receive one or more messages using a Bluetooth protocol and a cellular telephony protocol. In the interest of clarity, some specific parameter values defined by the UMTS protocol are used in the following description of the method 600. However, persons of ordinary skill in the art should appreciate that these parameter values are used for illustrative purposes only and are not intended to limit the present invention. Furthermore, the present invention is not limited to the UMTS protocol, the Bluetooth protocol, and/or any other particular wireless telecommunication protocol. In alternative embodiments, the method 600 may be used to receive messages over any desirable network in which multiple devices belonging to a defined set communicate with each other according to a first protocol and/or any desirable network in which multiple devices communicate with each other according to a second protocol, different from the first protocol.

In the method 600, a message is received (at 605). For example, a master device in a piconet may receive a message from a slave device, such as a mobile unit configured for wireless communications using a Bluetooth protocol and/or a cellular telephony protocol. Whether or not the message conforms to the Bluetooth protocol and the cellular telephony protocol is determined. For example, in the UMTS protocol, the message may be determined (at 610) to conform to the Bluetooth protocol and the cellular telephony protocol if a value of a protocol discriminator field is determined (at 610) to be equal to 0x4. For another example, in the UMTS protocol, the message may be determined to conform to the Bluetooth protocol and the cellular telephony protocol if a value of a protocol discriminator field is determined (at 615) to be equal to 0x0 and a value of a message type field is determined (at 620) to be equal to 0x1F. If the value of the protocol discriminator field is determined (at 615) to not be equal to 0x0, then the message may be processed (at 625) using other stacks according to the Bluetooth profile. If the value of the protocol discriminator field is determined (at 615) to be equal to 0x0 but the value of a message type field is not determined (at 620) to be equal to 0x1F, in the message may be processed (at 630) using conventional TCS Bin processing.

If it is determined that the message conforms to the Bluetooth protocol and the cellular telephony protocol, then the message is read (at 635) from the radio bearer and forwarded (at 640) to an appropriate processing block. For example, if the message is received (at 605) by a mobile unit, then the message is forwarded (at 640) to an RRC block, such as the RRC block 320 shown in FIG. 3B. For another example, if the message is received (at 605) by a base station, then the message is forwarded (at 640) to a mapper block.

As described above, the method 600 is a de-multiplexing event. In one embodiment, the method 600 is implemented in a receiver that can be made generic for both sides of the TCS Bin by including a receiver type field (not shown) which can be picked up on initial creation of the voice packet. Additional information may also be included in the header to identify the mobile-unit-to-base-station correspondence both in terms of UMTS signalling and for a voice traffic channel. Moreover, method 600 may also provide the hooks for a Voice over Internet Protocol (VoIP) solution.

Figure 7:
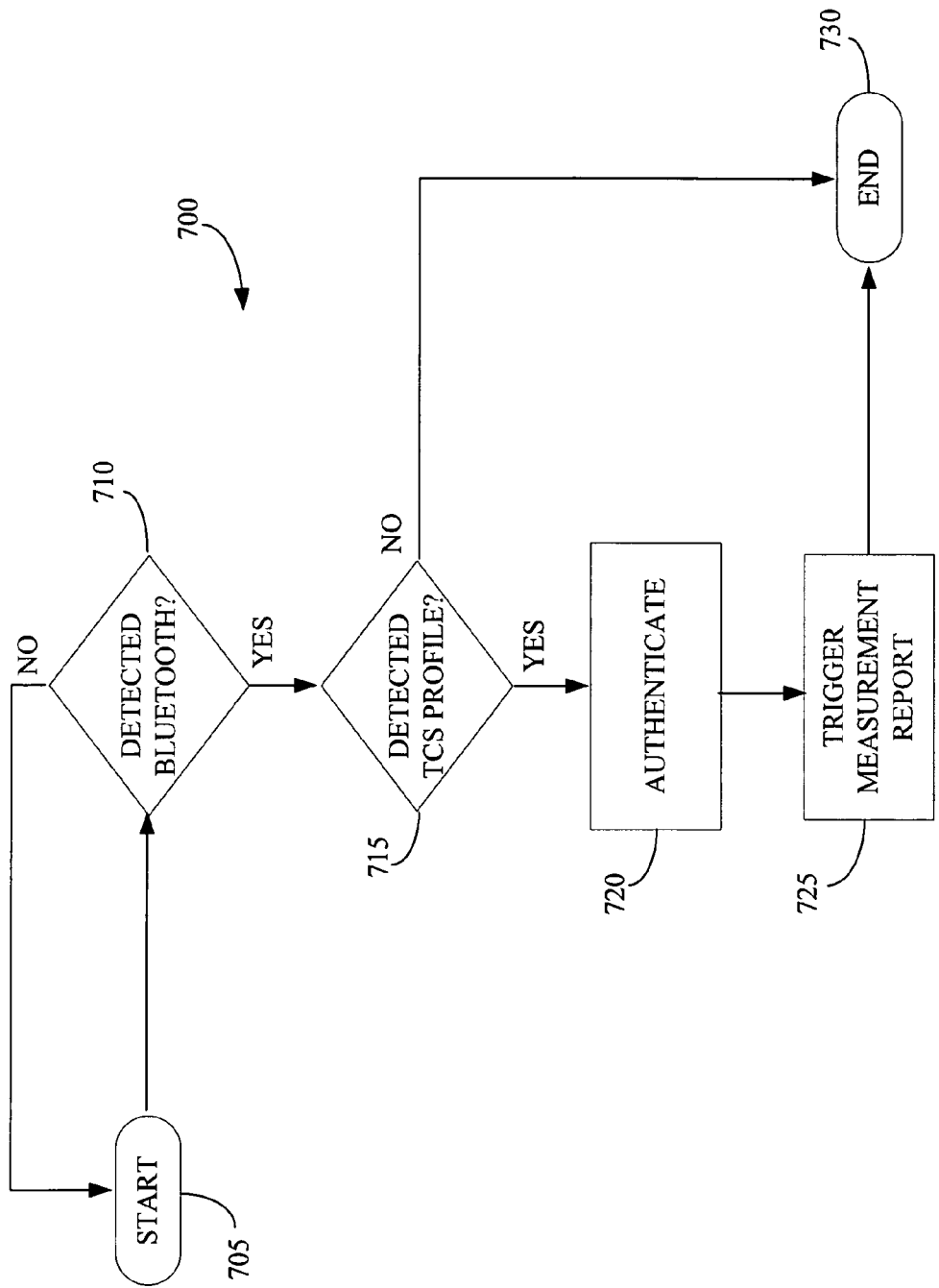
FIG. 7 illustrates a method of forming a wireless telecommunications link between at least one mobile unit and a base station according to the Bluetooth protocol and the cellular telephony protocol, in accordance with the present invention.

FIG. 7 illustrates a method 700 of forming a wireless telecommunications link between at least one mobile unit and a base station according to the Bluetooth protocol and the cellular telephony protocol. In one embodiment, the method 700 may be used to translate a random access channel (RACH) onto a Bluetooth network that includes devices that can communicate according to both the Bluetooth protocol and the cellular telephony protocol, such as the mobile unit 215 shown in FIG. 2. Each initial RACH across the air interface may occur independently of whether the mobile unit has a current cellular connection or not. In UMTS, the RACH is only performed to locate a mobile unit when no signaling connection exists (e.g., as the result of some paging action) or on an access request from the mobile unit to establish an initial radio signaling connection.

After the method 700 starts (at 705), a Bluetooth-enabled mobile unit is detected (at 710). For example, a UMTS RACH may be sent across a UMTS air interface independently of the current UMTS activity to indicate the presence of the mobile unit. The UMTS RACH may also be used inform a UMTS system that the mobile unit has moved into a Bluetooth service area, such as a piconet, and that a handoff followed by a serving radio network subsystem (SRNS) may occur.

Once the mobile unit is detected (at 710), a TCS profile associated with the mobile unit is detected (at 715). For example, the mobile unit may page a gateway and a resulting master slave exchange may be used to detect (at 710) the TCS profile. If the TCS profile indicates that the mobile unit is capable of communicating according to both the Bluetooth protocol and the cellular telephony protocol, then the mobile unit is authenticated (at 720). For example, the mobile unit may be authenticated (at 720) by sending a UMTS RACH over the Bluetooth interface. For another example, the mobile unit may be authenticated (at 720) using a pre-authorization provided by the cellular network.

A successful authentication (at 720), indicating that the RACH has been established, may trigger (at 725) a measurement report. In one embodiment, the successful authentication (at 720) may also include informing the mobile unit of a cell ID and an equivalent cellular pilot channel (CPICH) value. The cell ID and the equivalent cellular pilot channel (CPICH) value may be used to set up a soft-handoff between the piconet and the cellular telephone network For example, a the Radio Network Controller (RNC) may identify individual radio links within the set of combined links in soft handoff using these two quantities. In one embodiment, method 700 may be used as a portion of a method of performing horizontal rather than vertical system handoffs, e.g. between Bluetooth and any other cellular system. The method 700 may then end (at 730).

One or more embodiments of the present invention, as described above, may have one or more advantages over conventional Bluetooth and/or cellular telephone protocols. For example, the cordless telephony profile stack 300 shown in FIG. 3A and 3B, allows for backward compatibility, as discussed above. The cordless telephony profile stack provides the UMTS (or generic cellular) control stack, such as the cellular control stack 315 shown in FIG. 3B, access to the Bluetooth air interface. Thus, mobile units can be controlled seamlessly as if they were part of the cellular system. In particular, the mobile unit may be handed-off vertically in a seamless manner between the Bluetooth and cellular network. Accordingly, the present invention may be efficiently implemented in 4G systems.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method supporting roaming of a mobile unit between a first network in which multiple devices belonging to a defined set communicate with each other according to a first protocol, wherein the first protocol is a Bluetooth protocol and a second network that provides wireless connectivity according to a cellular telephony protocol, the mobile unit being capable of operation according to the first protocol and the cellular telephony protocol, the method comprising:

receiving a voice packet for transmission over at least one radio bearer between at least two devices in the first network, said at least one radio bearer being established according to the first protocol and the voice packet conforming to the cellular telephony protocol;

appending a header to the voice packet so that a cellular control stack controls processing of the voice packet according to the first protocol when a field of the header comprises a first value and the cellular control stack controls processing of the voice packet according to cellular telephony protocol when the field of the header comprises a second value different than the first value; and transmitting the voice packet using said at least one radio bearer.

2. The method of claim 1, wherein receiving the voice packet for transmission over the radio bearer comprises receiving the voice packet for transmission over the radio bearer according to the Bluetooth protocol.

3. The method of claim 1, wherein appending the header to the voice packet comprises appending the header to the voice packet so that the cellular control stack can manage a voice channel between an application and a speech synchronization controller according to the first protocol or the cellular telephony protocol depending on said at least one field of the header.

4. The method of claim 3, wherein the header comprises at least one field indicating at least one of a protocol discriminator, a message type indicator, and a radio bearer type indicator.

5. The method of claim 1, comprising mapping, using the cellular control stack, said at least one radio bearer to a wireless communication link that conforms to the cellular telephony protocol based upon said at least one field of the header.

6. A method for transmitting voice packet data over a selected one of a piconet in which multiple Bluetooth-enabled devices within a defined set communicate with each other by exchanging messages with a master device within the set using a Bluetooth protocol and a cellular wireless network in which mobile units and base stations exchange messages according to a cellular telephony protocol, the method comprising:

receiving a voice packet for transmission over at least one radio bearer between at least two devices in the piconet, said at least one radio bearer being established according to the Bluetooth protocol and the voice packet conforming to the cellular telephony protocol;

appending a header to the voice packet so that a cellular control stack can control processing of the voice packet according to the Bluetooth protocol when a field of the header comprises a first value and the cellular control stack controls processing of the voice packet according to cellular telephony protocol when the field of the header comprises a second value different than the first value; and transmitting the voice packet using said at least one radio bearer.

7. The method of claim 6, comprising establishing said at least one radio bearer in an Industrial, Scientific, Medical (ISM) band at about 2.4 GHz.

8. The method of claim 6, wherein receiving the voice packet for transmission comprises receiving the voice packet using at least one of a mobile unit and a base station.

9. The method of claim 6, wherein appending the header to the voice packet comprises appending the header to the voice packet so that the cellular control stack can manage a voice channel between an application and a speech synchronization controller according to the first protocol or the cellular telephony protocol depending on said at least one field of the header.

10. The method of claim 9, wherein appending header to the voice packet comprises appending the header comprising at least one field indicating at least one of a protocol discriminator, a message type indicator, a radio bearer type indicator, and a cellular control type indicator.

11. The method of claim 10, wherein appending the header comprises appending the header comprising at least one of a protocol discriminator field value of 0x4 and a message type indicator field value of 0x1F to indicate that the cellular control stack is to manage the voice channel according to the cellular telephony protocol.

12. The method of claim 6, comprising mapping, using the cellular control stack, the radio bearer to a wireless communication link that conforms to the cellular telephony protocol based upon at least one value of the header appended to the voice packet.

13. A method for wireless telecommunications using a first network in which multiple devices belonging to a defined set communicate with each other according to a first protocol wherein the first protocol is a Bluetooth protocol and a second network in which multiple devices communicate with each other according to a second protocol wherein the second protocol is a cellular telephony protocol, the method comprising:

forming a wireless telecommunications link between a first device configured to send and receive messages according to the first protocol and a second device configured to send and receive messages according to the second protocol, the wireless telecommunications link comprising a portion that operates according to the first protocol and a portion that operates according to the second protocol, and wherein the messages sent over the wireless communication link between the first and second devices comprise a header, and wherein a cellular control stack controls processing of the messages according to the first protocol when a field of the header comprises a first value and the cellular control stack controls processing of the messages according to the second protocol when the field of the header comprises a second value different than the first value.

14. The method of claim 13, wherein detecting the first device comprises detecting the first device based upon at least one of a paging message and an access request.

15. The method of claim 13, comprising controlling processing of the messages transmitted over the wireless telecommunications link by managing a voice channel with a speech synchronization controller according to the first protocol or the second protocol depending upon values of at least one of a protocol discriminator, a message type indicator, a radio bearer type indicator, or a cellular control type indicator included in at least one field of the header.

16. The method of claim 13, wherein forming the wireless telecommunications link between the first device and the second device comprises forming a random access channel between the first device and the second device.

17. The method of claim 13, wherein forming a wireless telecommunications link between the first and the second device comprises providing at least one of a cell identification value and a common pilot channel value.

18. A method for wireless telecommunications using a piconet in which multiple Bluetooth-enabled devices within a defined set communicate with each other by exchanging messages with a master device within the set using a Bluetooth protocol and a cellular wireless network in which mobile units and base stations exchange messages according to a cellular telephony protocol, the method comprising:

forming a random access channel between a first device configured to send and receive messages according to the Bluetooth protocol and a second device configured to send and receive messages according to the cellular telephony protocol, the random access channel comprising a portion that operates according to the Bluetooth protocol and a portion that operates according to the cellular telephony protocol, and wherein the messages sent over the random access channels between the first and second devices comprise a header, and a cellular control stack controls processing of the messages according to the Bluetooth protocol when a field of the header comprises a first value and the cellular control stack controls processing of the messages according to the cellular telephony protocol when the field of the header comprises a second value different than the first value.

19. The method of claim 18, wherein detecting the first device comprises detecting the first device based upon at least one of a paging message and an access request.

20. The method of claim 19, comprising controlling processing of the messages transmitted over the wireless telecommunications link by managing a voice channel with a speech synchronization controller according to the Bluetooth or cellular telephony protocols depending upon values of at least one field in the header indicating at least one of a protocol discriminator, a message type indicator, a radio bearer type indicator, and a cellular control type indicator.

21. The method of claim 19, wherein forming the random access channel between the first device and the second device comprises forming the random access channel between a mobile unit and a base station.

22. The method of claim 19, wherein forming the random access channel between the first and the second device comprises providing at least one of a cell identification value and a common pilot channel value.

* * * * *